(12) United States Patent
Chaudhuri et al.

(10) Patent No.: US 7,346,601 B2
(45) Date of Patent: Mar. 18, 2008

(54) EFFICIENT EVALUATION OF QUERIES WITH MINING PREDICATES

(75) Inventors: Surajit Chaudhuri, Redmond, WA (US); Vivek Narasayya, Redmond, WA (US); Sunita Sarawagi, Mumbai (IN)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 10/161,308

(22) Filed: Jun. 3, 2002

(65) Prior Publication Data

US 2003/0229635 A1    Dec. 11, 2003

(51) Int. Cl.
G06F 17/30    (2006.01)

(52) U.S. Cl. .............................. 707/2; 707/4

(58) Field of Classification Search .................. 707/5, 707/2–4, 6
See application file for complete search history.

(56) References Cited

U.S. PATENT DOCUMENTS

| | | | | |
|---|---|---|---|---|
| 6,629,095 | B1 * | 9/2003 | Wagstaff et al. | 707/5 |
| 6,804,669 | B2 * | 10/2004 | Aggarwal | 707/6 |
| 2002/0143755 | A1 * | 10/2002 | Wynblatt et al. | 707/3 |

OTHER PUBLICATIONS

SQL Multimedia and Application Packages Part 6: Data Mining, ISO Draft Recommendations, 1999.
R. Agrawal, J. Gehrke, D. Gunopulos and P. Raghavan, "Automatic Subspace Clustering of High Dimensional Data for Data Mining Applications", pp. 94-105, In Proceedings ACM SIGMOD International Conference on Management of Data, Seattle, WA, USA, Jun. 1998.
R. Agrawal, S. Ghosh, T. Imielinski, B. Iyer and A. Swami, "An Interval Classifier for Database Mining Applications", pp. 560-573, Proceedings of the 18$^{th}$ VLDB Conference, Vancouver, British Columbia, Canada, 1992.
S. Agrawal, S. Chaudhuri, L. Kollar, V. Narasayya, Index Tuning Wizard for Microsoft SQL Server 2000, http://msdn.microsoft.com/library/techart/itwforsql.htm, 2000.
M. Berger and I. Regoutsos, "An Algorithm for Point Clustering and Grid Generation", IEEE Transactions on Systems, Man and Cybernetics, vol. 21, No. 5, Sep./Oct. 1991, pp. 1278-1286, 1991.
S. Chaudhuri, "Data Mining and Database Systems: Where is the Intersection?", Bulletin of Technical Committee on Data Engineering, vol. 21, pp. 1-5, Mar. 1998.
S. Chaudhuri and U. Dayal, "Data Warehousing and OLAP for Decision Support", pp. 507-508, ACM SIGMOD Record, Mar. 1997.

(Continued)

Primary Examiner—Apu Mofiz
Assistant Examiner—Cam Linh Nguyen

(57) ABSTRACT

A method for evaluating a user query on a database having a mining model that classifies records contained in the database into classes when the query comprises at least one mining predicate that refers to a class of database records. An upper envelope is derived for the class referred to by the mining predicate corresponding to a query that returns a set of database records that includes all of the database records belonging to the class. The upper envelope is included in the user query for query evaluation. The method may be practiced during a preprocessing phase by evaluating the mining model to extract a set of classes of the database records and deriving an upper envelope for each class. These upper envelopes are stored for access during user query evaluation.

35 Claims, 6 Drawing Sheets

OTHER PUBLICATIONS

S. Chaudhuri and V. Narasayya, "An Efficient, Cost-Driven Index Selection Tool for Microsoft SQL Server", In VLDB '97 Proceedings of 23rd International Conference on Very Large Data Bases, Aug. 1997, pp. 146-155.

S. Chaudhuri and K. Shim, "Optimization of Queries with User-Defined Predicates", ACM Transactions on Database Systems, vol. 24, No. 2, Jun. 1999, pp. 177-228.

OLE DB for Data Mining, http://www.microsoft.com/data/oledb.

M. Ester, H.P. Kriegel, J. Sander, X. Xu, "A Density-Based Algorithm for Discovering Clusters in Large Spatial Databases with Noise", Proceedings of the 2nd International Conference on Knowledge Discovery in Databases and Data Mining, Aug. 1996.

J. Hellerstein, M. Stonebraker, "Predicate Migration: Optimizing Queries with expensive Predicates", SIGMOD Conference, 1993, pp. 267-276.

S.J. Hong, R.G. Cain, D.L. Ostapko, "MINI: A Heuristic Approach for Logic Minimization", Sep. 1974, pp. 443-458.

IBM Intelligent Miner Scoring, Administration and Programming for DB2, Version 7.1, Mar. 2001.

R. Meo, G. Psaila and S. Ceri, "An Extension to SQL for Mining Association Rules", Data Mining and Knowledge Discovery, vol. 2, pp. 195-224, 1998.

R. Reckhow and J. Culberson, "Covering a Simple Orthogonal Polygon with a Minimum Number of Orthogonally Convex Polygons", 1987, Proceedings of the ACM 3rd Annual Computational Geometry Conference, pp. 268-277.

S. Sarawagi, S. Thomas and R. Agrawal, "Integrating Association Rule Mining with Relational Database Systems: Alternatives and Implications", Proceedings ACM SIGMOD International Conference on Management of Data, Jun. 1998, pp. 343-354.

W. Scheufele and G. Moerkotte, "Efficient Dynamic Programming Algorithms for Ordering expensive Joins and Selections", Proceedings of the 6th International Conference on Extending Database Technology, 1998, pp. 201-215.

Integrating Data Mining with SQL Databases: OLE DB for Data Mining, A. Netz, S. Chaudhuri, U. Fayyad, J. Bernhardt.

* cited by examiner

| $d_1 \downarrow$ | | $p(c_1) = 0.33, p(c_2) = 0.5, p(c_3) = 0.17$ | | |
|---|---|---|---|---|
| $m_{01}$  .01, .7, .05 | .001, .03, .0005 ($c_2$) | .001, .03, .0005 ($c_2$) | .0002, .1, .004 ($c_2$) | .0002, .1, .004 ($c_2$) |
| $m_{11}$  .5, .29, .05 | .07, .01, .0005 ($c_1$) | .07, .01, .0005 ($c_1$) | .009, .06, .004 ($c_2$) | .009, .06, .004 ($c_2$) |
| $m_{21}$  .49, .1, .9 | .07, .0005, .009 ($c_1$) | .07, .0005, .009 ($c_1$) | .009, .002, .07 ($c_3$) | .009, .002, .07 ($c_3$) |
| $d_0 \rightarrow$ | .4, .1, .05 | .4, .1, .05 | .05, .4, .4 | .05, .4, .4 |
| | $m_{00}$ | $m_{10}$ | $m_{20}$ | $m_{30}$ |

Fig.5a

| REGION: $d_0, d_1$ | [0..3], [0..2] | [0..3], [0..2] | [0..3], [0..1] | [0..1], [0..1] | [2..3], [0..1] |
|---|---|---|---|---|---|
| MINPROB: | .0002, .0005, .0005 | .0002, .03, .0005 | .009, .0005, .0005 | .07, .0005, .0005 | .009, .002, .004 |
| MAXPROB: | .07, .1, .07 | .0014, .1, .004 | .07, .06, .07 | .07, .01, .009 | .009, .06, .07 |
| STATUS: | AMBIGUOUS | MUST-LOSE | AMBIGUOUS | MUST-WIN | AMBIGUOUS |
| | (a) | (b) | (c) | (d) | (e) |

Fig.5b

EFFICIENT EVALUATION OF QUERIES WITH MINING PREDICATES

TECHNICAL FIELD

The invention concerns the field of databases and data mining. The invention relates more specifically to the field of user query evaluation for queries containing predicates that refer to classification of data in a data mining model.

BACKGROUND OF THE INVENTION

Progress in database technology has made massive warehouses of business data ubiquitous. There is increasing commercial interest mining the information in such warehouses. Data mining is used to extract predictive models from data that can be used for a variety of business tasks. For example, based on a customer's profile information, a model can be used for predicting if a customer is likely to buy sports items. The result of such a prediction can be leveraged in the context of many applications, e.g., a mail campaign or an on-line targeted advertisement. Typical data mining models include decision tree, clustering, and naïve Bayes classifiers.

The traditional way of integrating mining with querying is to pose a standard database query to a relational backend. The mining model is subsequently applied in the client/middleware on the result of the database query. Thus a mining query such as "Find customers who visited the MSNBC site last week and who are predicted to belong to the category of baseball fans", would be evaluated in the following phases: (a) execute a SQL query at the database server to obtain all the customers who visited MSNBC last week, and (b) for each customer fetched into the client/middleware, apply the mining model to determine if the customer is predicted to be a baseball "fan". While this approach might provide adequate results, if the number of customers predicted to be "baseball fans" is significantly lower than the number of customers who visited MSNBC last week, this may not be the most efficient way to process the query.

Recently, several database vendors have made it possible to integrate data mining techniques with relational databases by applying predictive models on relational data using SQL extensions. The predictive models can either be built natively or imported, using Predictive Model Markup Language (PMML) or other interchange format. FIG. 6 depicts an overview of the Microsoft Analysis server product (part of SQL Server 2000) in which mining models are explicitly recognized as first-class table-like objects. Creation of a mining model corresponds to the schematic definition of a mining model. The following example shows creation of a mining model that predicts risk level of customers based on source columns gender, purchases and age using decision trees:

```
CREATE MINING MODEL Risk      //Name of Model
(
Customer_ID LONG KEY,          //Source Column
Gender TEXT DISCRETE,          //Source Column
Risk TEXT DISCRETE PREDICT,    //Prediction Column
Purchases DOUBLE DISCRETIZED,  //Source Column
Age DOUBLE DISCRETIZED,        //Source Column
)
USING [Decision_Trees_101]     //Mining Algorithm
```

The model is trained using the INSERT INTO statement that inserts training data into the model. Predictions are obtained from a model M on a dataset D using a prediction join between D and M. A prediction join is different from a traditional equi-join on tables since the model does not actually contain data details. The following example illustrates prediction join:

```
SELECT D.CustomerID, M.Risk
FROM [Risk]M
PREDICTION JOIN
(SELECT Customer_ID, Gender, Age, sum(Purchases) as SP
    FROM Customers D Group BY Customer_ID, Gender, Age) as D
    and M.Age = D.Age
    and M.Purchases = t.SP
    WHERE M.Risk = "low"
```

In this example, the value of "Risk" for each customer is not known. Joining rows in the Customers table to the model M returns a predicted "Risk" for each customer. The WHERE clause specifies which predicted values should be extracted and returned in the result set of the query. Specifically, the above example has the mining predicate Risk="low".

IBM's Intelligent Miner (IM) Scoring product integrates the model application functionality of IBM Intelligent Miner for Data with the DB2 Universal Database. Trained mining models in flat file, SML, or PMML format can be imported into the database. An example of importing a classification model for predicting the risk level of a customer into a database using a UDF called ID-MMX.DM_impClasFile( ) follows:

INSERT INTO IDMMX.ClassifModels values ('Risk', IDMMX.DM_impClasFile('/tmp/myclassifier.x'))

Once the model is loaded into a database, it can be applied to compatible records in the database by invoking another set of User Defined Functions (UDFs). An example of applying the above classification mining model ("Risk") on a data table called Customers is shown below:

```
SELECT Customer_ID, Risk
FROM (
    SELECT Customer_ID IDMMX.DM_getPredClass(
        IDMMX.DM_applyClasModel(c.model,IDMMX.DM_
        applData(
            IDMMX.DM_applData('AG', s.age),'PURCHASE',
            s.purchase)))
as Risk
    FROM ClassifModels c, Customer_list s
    WHERE c.modelname='Risk' and s.Salary<40000
)WHERE Risk = 'low'
```

The UDF IDMMX.DM_applData is used to map the fields s.Salary and s.age of the Customer_list table into the corresponding fields for the model for use during prediction. The UDF IDMMX.DM_applyClasModel ( ) applies the model on the mapped data and returns a composite result object that has along with the predicted class other associated statistics like confidence of prediction. A second UDF ID-MMX.DM_getPredClass extracts the predicted class from this result object. The mining predicate in this query is: Risk='low'.

Because existing systems handle queries containing mining predicates by applying the mining model as a filter on the intermediate results from the traditional predicates of the SQL query, they do not exploit the mining predicates for better access path selection. The main challenge in exploiting mining predicates for access path selection is that each mining model has its own specific method of predicting classes as a function of the input attributes. Some of these methods are too complex to be directly usable by traditional database engines.

SUMMARY OF THE INVENTION

A user query containing mining predicates is modified for optimization purposes by including an upper envelope in the query that corresponds to a query predicate that selects the records belonging to the class(es) referred to by the mining predicate. The presence of the upper envelope, or upper envelopes, provides the query optimizer the option of using additional access paths on the columns referenced in the upper envelope when evaluating the query. This availability of additional access paths, such as indexes defined on columns referenced by the upper envelope, may speed up execution of the query.

A system for evaluating a user query on a database having a mining model that classifies records contained in the database into classes is provided. The system is for use when the query includes at least one mining predicate that refers to a class of database records. The system performs method steps by which an upper envelope for the class referred to by the mining predicate is derived corresponding to a query predicate that returns a set of database records that includes all of the database records belonging to that class. The upper envelope is included in the user query for evaluation purposes. Preferably the upper envelopes are derived during a preprocessing step in which the mining model is evaluated to extract a set of classes of the database records and an upper envelope is derived for each class. These upper envelopes are stored for access during user query evaluation, such as during query optimization.

For more complex queries, an upper envelope is formed by combining a plurality of upper envelopes and wherein the upper envelope is included with the user query. For example, when the user query seeks to return data records whose class label is a member of a given set of class labels the upper envelope becomes a disjunct of the upper envelopes for each class label in the set of class labels referred to by the user query. When the user query seeks to return data records whose class label has been assigned the same class label by all mining models, the upper envelope is formed by enumerating each class label for each of the mining models, finding upper envelopes for each mining model for that class label, forming a conjunctive expression by taking the conjunction of upper envelopes of each mining model, and then taking the disjunction of these conjunctive expressions over all class labels. When the mining model assigns a class label to a data record that predicts the value of a given column in the data record and the user query seeks to return data records in which the predicted value matches the actual value in the data column, the upper envelope is formed by enumerating each class label for the mining model, finding an upper envelope for that class label, forming a conjunctive expression of the upper envelope and a predicate that selects data records where the given column is equal to the class label, and forming a disjunctive expression of these conjunctive expressions over all class labels.

Upper envelopes are derived by an algorithm selected based on the type of mining model in use by the database system. For a mining model that employs decision trees having a root node connected to test nodes having a test condition and leaf nodes having a class label, the upper envelope for a given class label is derived by forming a conjunct of the test conditions between the root and each leaf node having the given class label and forming a disjunct of the conjuncts of the test conditions. In the case where the mining model is a rule based learner having a set of if-then rules, and each rule has a body of conditions on the data attributes and a head having one of the class labels, the upper envelope for a given class label is derived by forming a disjunct of the rules having the given class label as the head.

In a database system where the data records have n attributes and the class label of each data record is assigned by the mining model a position based on attribute values in an n dimensional space having a dimension for each attribute, the upper envelope for a given class label is derived by forming a disjunct of boundaries of regions that cover all data records having the given class label. The boundaries are described in terms of ranges of attribute values. The upper envelope for a given class label can be derived by describing an initial region that covers the entire n dimensional space, removing sub-regions that do not contain any data records having the given class label, and describing the resulting region.

To arrive at a final region, sub-regions can be removed from the initial region by calculating a probability that the data records in the sub-region have a given class label. Sub-regions having a probability below a predetermined threshold are removed. According to another embodiment, the probability that data records in the sub-region having a certain class label can be calculated for all class labels. The upper envelope for the given class label is derived by removing a sub-region based on a comparison between the probability for the given class label and the probabilities for the other class labels.

The sub-regions that contain data records having different class labels can be shrunk or split into split sub-regions then re-evaluated to determine if they should be removed. To simplify the upper envelope, sub-regions that have been removed can be merged.

In a clustering model that determines each class as a centroid and a region surrounding the centroid, the upper envelope for a given class label is derived by describing a set of rectangular regions that cover the region for the given class label.

These and other objects, advantages, and features of the invention will be better understood from the accompanying detailed description of a preferred embodiment of the invention when reviewed in conjunction with the accompanying drawings.

BRIEF DESCRIPTION OF THE DRAWINGS

The present invention is illustrated by way of example and not limitation in the figures of the accompanying drawings, in which:

FIG. 5 is an example of a naive Bayes classifier; and

DETAILED DESCRIPTION OF THE PREFERRED EMBODIMENT

Exemplary Operating Environment

Figure 1:
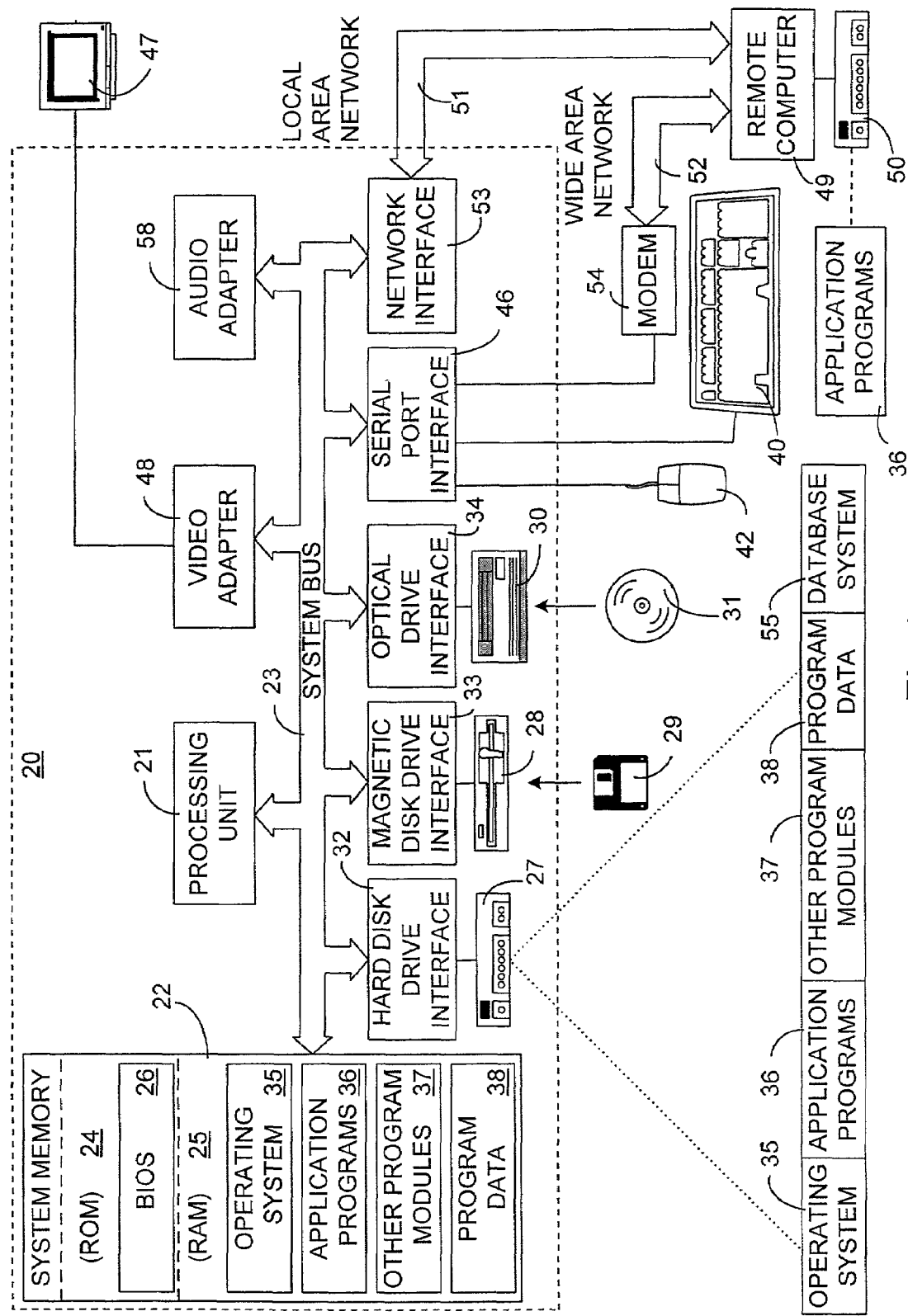
FIG. 1 illustrates an exemplary operating environment for a system for evaluating database queries containing mining predicates.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Database System

Figure 2:
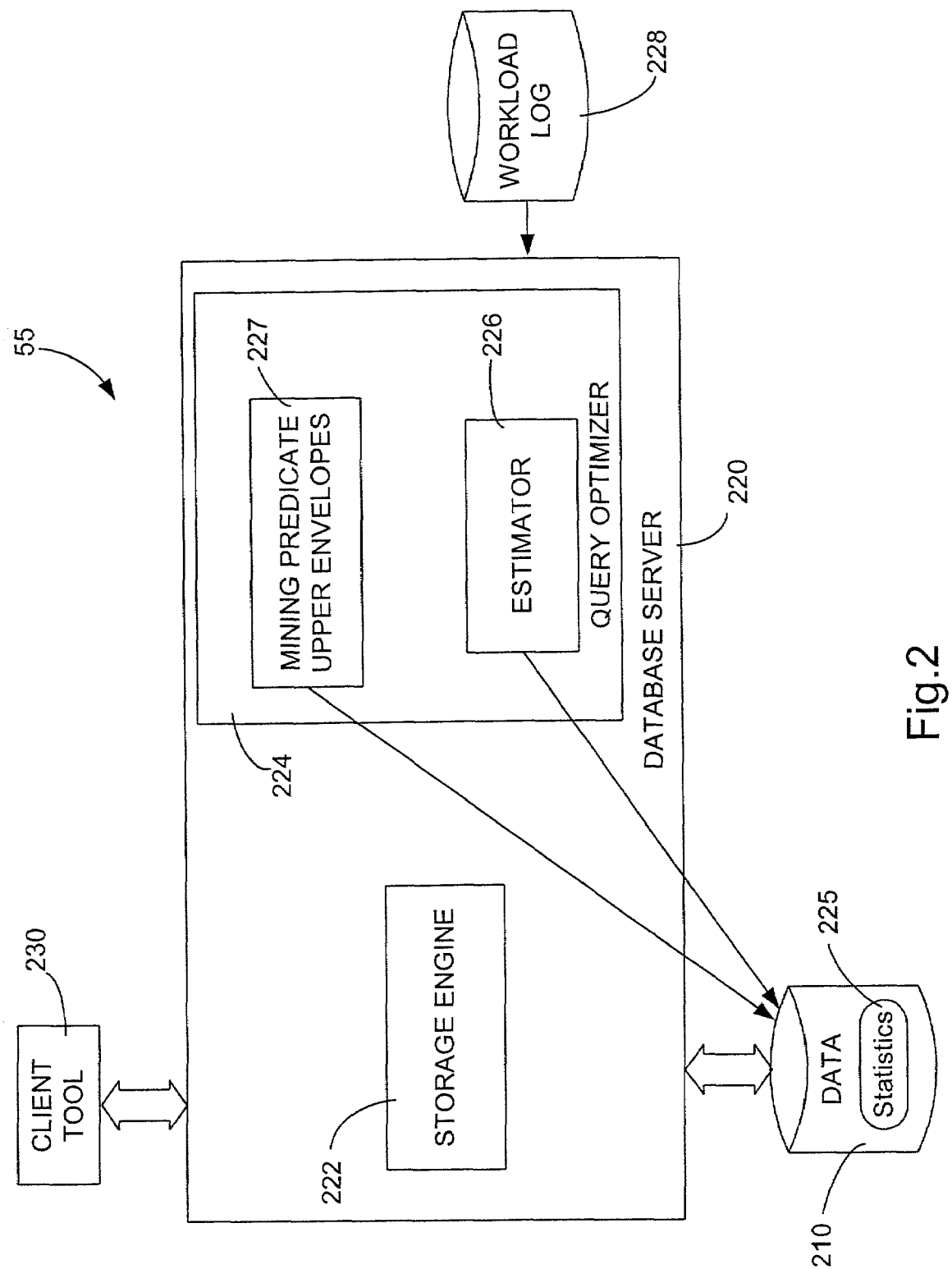
FIG. 2 is a block diagram of a system for evaluating database queries according to an embodiment of the present invention.

FIG. 2 illustrates for one embodiment a computer database system 55 comprising a database 210, a database server 220, and a client tool 230. Database system 55 may be resident on the personal computer 20 or may be remotely located from the personal computer (see FIG. 1). The database system 55 manages the storage and retrieval of data in database 210 in accordance with data manipulation statements or queries presented to database system 55 by a database application or by a user, for example.

Database 210 comprises a set of tables of data. Each table comprises a set of records of data stored in one or more data fields. The records of a table are also referred to as rows or tuples, and the data fields of records in a table are also referred to as columns. A data mining model is produced by the computer 120 by executing a stored computer program that implements a data mining engine or component (not shown).

Database server 220 processes queries, for example, to retrieve, insert, delete, and/or modify data in database 210. A typical user query includes a selection of data from the database, for example a simple query may inquire about how many records fall between the values represented by certain endpoints, designated rangehigh and rangelow. Other, more complicated queries may involve joins of numerous attributes, but even more complicated queries may have simple selection queries imbedded within them. Database system 55 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in database 210. To enhance performance in processing queries, database server 220 comprises a query optimizer 224 to generate efficient execution plans for queries. Query optimizer 224 comprises an estimator 226 which accesses statistics 225 about the database and a set of mining predicate upper envelopes 227 derived from the data mining model that resides in the database 55 to estimate the selectivities of a user query. The statistics 225 and mining predicate upper envelopes 227 may be stored in the data stored in the database 210 and loaded into the database when the system is started. The estimator 226 may estimate the selectivities of the operations involved in a user query to determine the order in which these operations should be executed. Query optimizer 224 may maintain or access a workload log 228 which records the series of user queries executed against the system.

The Generic Technique

Figure 3:
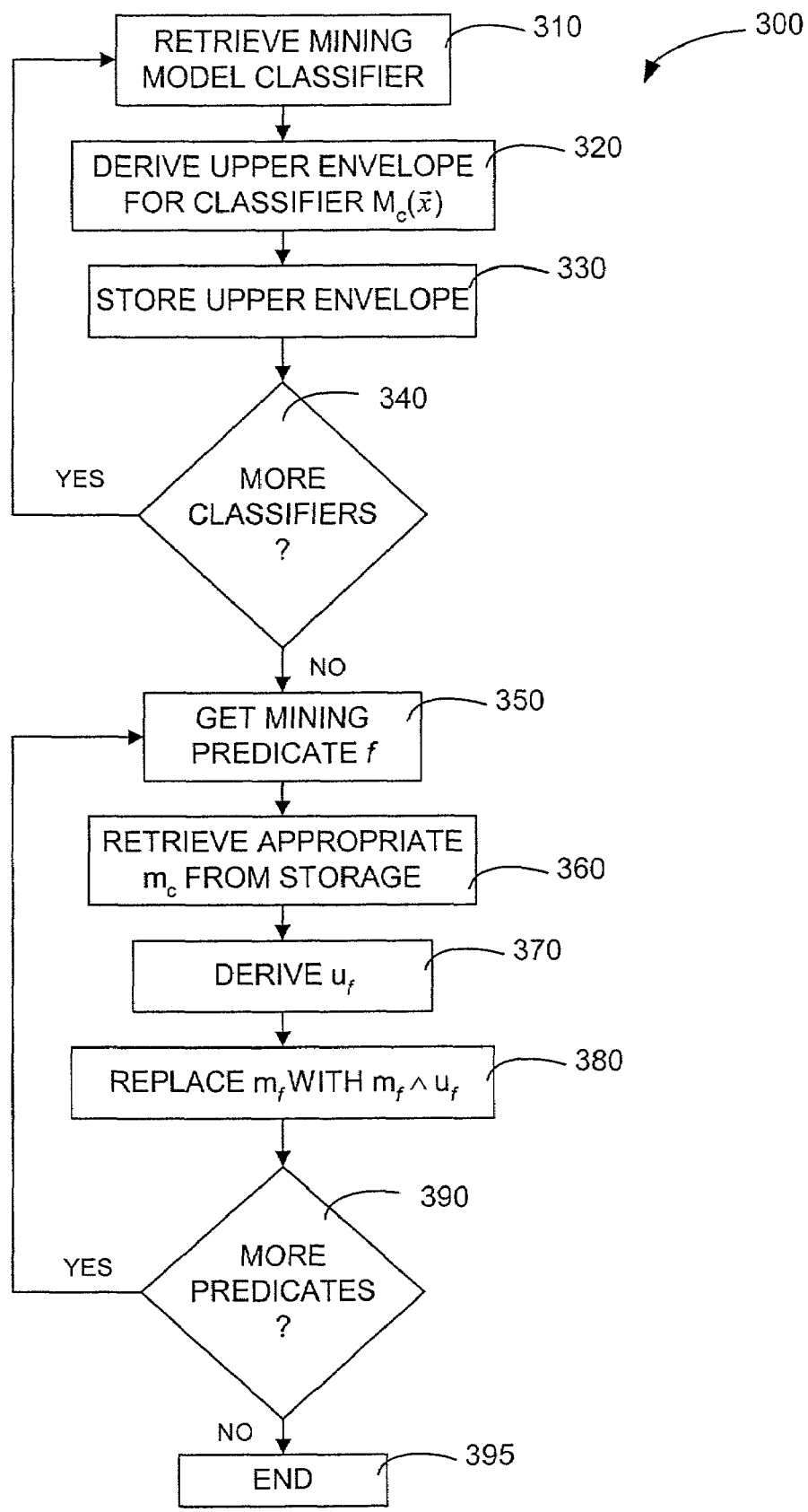
FIG. 3 is a flowchart representation of method steps used to practice an embodiment of the present invention.

Referring now to FIG. 3, a general overview of the method steps employed by a system for evaluating database queries containing mining predicates 300 is depicted. For the purposes of this description, the method steps are performed on a database in which a predictive mining model that when applied to a tuple $\vec{x}$ predict one of K discrete classes $c_1, \ldots c_K$. Most classification and clustering models fall in this category. Application of the present invention to databases that employ mining models that make real-valued predictions is contemplated, but not discussed herein.

In steps 310-320, for a class c that the model M predicts, an "upper envelope" is derived using a model-specific algorithm (specific algorithms for three popular mining models will be described in later sections). The upper envelope is a predicate of the form $M_c(\vec{x})$ such that the tuple $\vec{x}$ has class c only if it satisfies the predicate $M_c(\vec{x})$, but not necessarily vice versa. This means that the upper envelope derived for class c must return a super set of the tuples found in class c. $M_c(\vec{x})$ is a propositional upper envelope consisting of simple selection conditions on attributes of $\vec{x}$. The "tightness" of the upper envelope, or the difference between the number of tuples in class c versus those returned by the upper envelope, may be traded off for complexity in processing the upper envelope during optimization by making the upper envelope "looser" but less complex. In step 330, the upper envelope $M_c(\vec{x})$ is stored for later use in query evaluation. Predicates are derived and stored for every possible class that the mining model M predicts (step 340). Steps 310-340 are preferably performed during a preprocessing or training phase and periodically updated as the mining model is changed.

In steps 350-390, the upper envelopes are added to a query having a mining predicate f that references at least one mining class c to generate a semantically equivalent query that would result in the same set of answers over any database. Since $M_c(\vec{x})$ is a predicate on the attributes of $\vec{x}$, it has the potential of better exploiting index structures and improving the efficiency of the query. The derived predicate is then exploited for access path selection like any other traditional database predicate.

In step 350, a mining predicate f is identified in a query that references at least one class c from mining model $M_f$. In step 360, the appropriate upper envelope $M_c$ for the class c is retrieved. Depending on the type of query, an upper envelope, $u_f$, may be constructed (step 370). While simply adding the "atomic" upper envelope $M_c$ to a query is sufficient for mining predicates of the form "Prediction_column=class_label", a wider class of mining predicates may be optimized by combining the atomic upper envelopes to form an upper envelope $u_f$ to be added to a query. For example, mining predicates of the form "M.Prediction_column IN $(c_1, \ldots, c_l)$", where $c_1, \ldots, c_l$ are a subset of the possible class labels on M.Prediction_column present a relatively simple generalization. An example of such a query is to identify customers whom a data mining model predicts to be either baseball fans or football fans. For this type of mining predicate, the upper envelope $u_f$ is a disjunction of the upper envelopes corresponding to each of the atomic mining predicates. Thus, if $M_{ci}$ denotes the predicate (M.Prediction_column=$c_i$), the overall disjunct is expressed as $\vee^l_{i=1} M_{ci}$.

Another form of join predicates is M1.Prediction_column1=M2.Prediction_column2. Such predicates select instances on which two models M1 and M2 concur in their predicted class labels. An example of such a query is "Find all microsoft.com visitors who are predicted to be web developers by two mining models SAS_customer_model and SPSS_customer_model". To optimize this query using upper envelopes, it is assumed that class labels for each of the mining models can be enumerated during optimization by examining the metadata associated with the mining models. In typical mining models it is expected that the number of classes will be quite small. The class labels that are common to the two mining models are $\{c_1, c_2, \ldots, c_k\}$. The above join predicate is equivalent to: $\vee^k_{i=1}$(M1.Prediction_column=M2.Prediction_column2=$c_i$). Per the previous notation, this can be expressed as $\vee_i(M1_{ci} \wedge M2_{ci})$. Note that if M1 and M2 are identical models, then the resulting upper envelope results in a tautology. Conversely, if M1 and M2 are contradictory, then the upper envelope evaluates to false and the query is guaranteed to return no answers. These observations can be leveraged during the optimization process to improve efficiency.

Predicates of the form M1.Prediction_column=T.Data_column check if the prediction of a mining model matches that of a database column. An example of this type of predicate is "Find all customers for whom predicted age is of the same category as the actual age". Such queries can occur, for example, in cross-validation tasks. A set of possible class labels is enumerated (this is feasible since the number of classes is likely small). If the set of classes are $\{c_1, c_2, \ldots, c_k\}$, then an implied predicate $\vee_i(M1_{ci} \wedge T.Data\_column=c_i)$ can be derived. The query is thus transformed into a disjunct or a union of queries and the content of the mining model may now be leveraged for access path selection. For example, for the i-th disjunct, the optimizer can potentially consider either the predicate T.Data_column=$c_i$ or a predicate in M1$c_i$ for access path selection. The final plan depends on other alternatives considered by the optimizer (including sequential scan), but appending the predicate M1$c_1$ makes additional alternatives available.

The traditional approach of exploiting transitivity of predicates in the WHERE clause can also be effective. For example, if the query contains additional predicates on T.Data_columns that indirectly limit the possible domain values M1.Prediction_column can assume, then the optimization of the IN predicates discussed earlier can be applied. For example, if the query were "Find all customers for which predicted age is the same as the actual age and the actual age is either old or middle-aged" then via transitivity of the predicate, a predicate M.Prediction_column IN ('old', 'middle-aged') is appropriate and the techniques discussed earlier apply.

Once the cumulative predicate $u_f$ is constructed, the mining predicate f is replaced with $f \wedge u_f$ in step 380 and the process repeated via step 390 with any additional mining predicates in the query. The above outlined process for constructing a cumulative predicate improves efficiency in handling queries that contain mining predicates if 1) the evaluation of the upper envelopes does not add to the cost of the query and 2) if the optimizer is not misguided by the introduction of the additional complex boolean predicates due to the upper envelopes. To improve the cost aspect of processing queries to which complex upper envelope have been appended for use during optimization, the upper envelopes that are not chosen for use in path selection may be removed at the end of optimization. As to dealing with optimizers that do not handle complex boolean expressions well, a threshold on the number of disjuncts and simplification based on selectivity estimates to limit the complexity enable less capable optimizers to exploit upper envelopes.

The technique outlined in FIG. 3 requires access to the content of mining model information such as class labels during optimization. Such information is different from the traditional statistical information about tables because the correctness of the optimization is impacted if the mining model is changes. In such cases, an execution plan that has been generated that exploits outdated predicates must be invalidated. However, because mining models evolve slowly and the size of a typical mining model is relatively small compared to data size, optimization time is not severely impacted for accessing the content of a mining model.

The remaining sections of this description will discuss more specific implementations of the invention for three popular mining models: decision tree, naive Bayes classifiers, and clustering. Algorithms for practicing step 320 of the method 300 already described are presented. While specific mining models are described herein, practice of the present invention is not limited to use with these mining models.

Deriving Upper Envelopes for Decision Tree Mining Model

Figure 4:
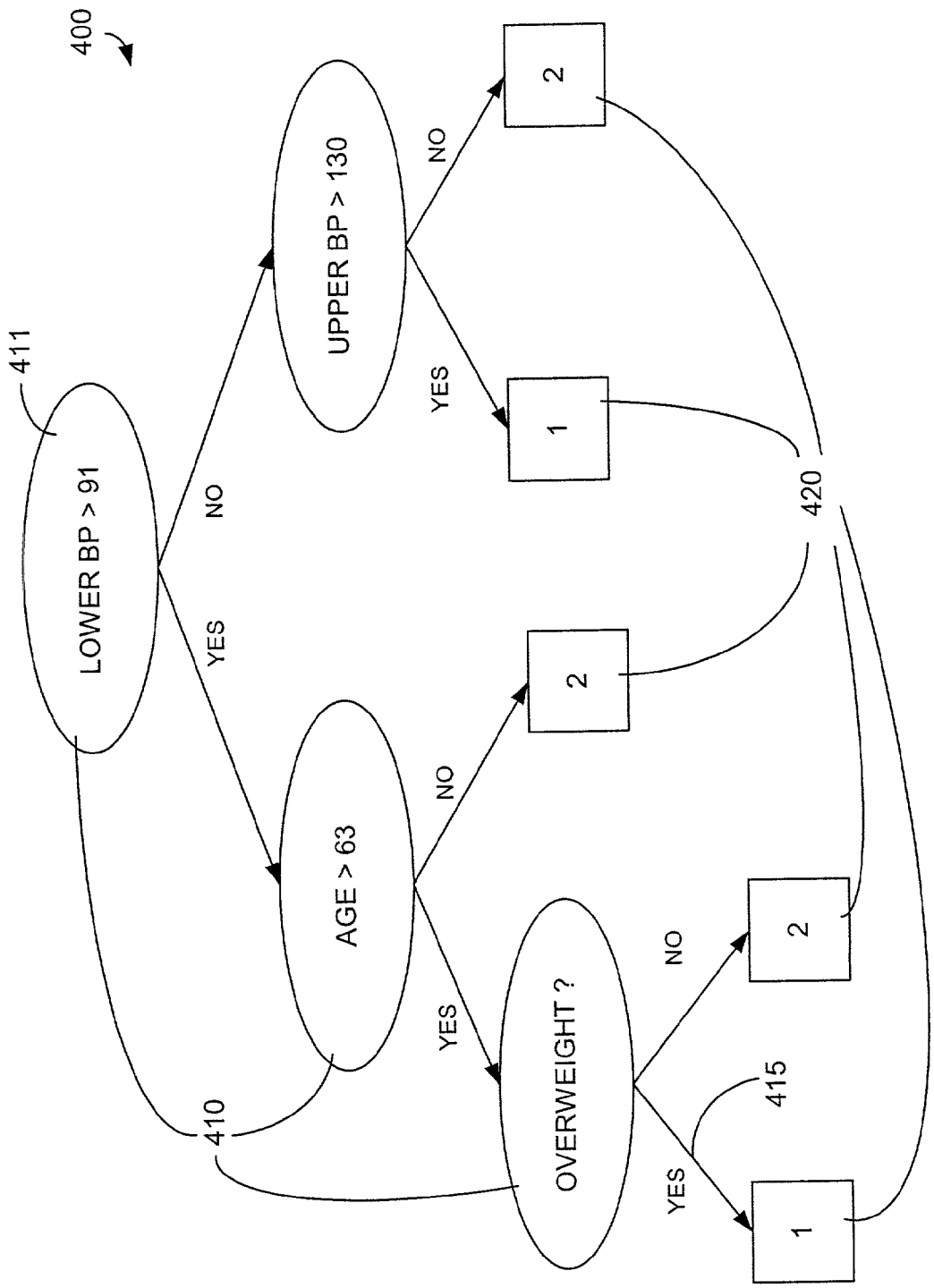
FIG. 4 is an example of a decision tree type mining model.
Figure 6:
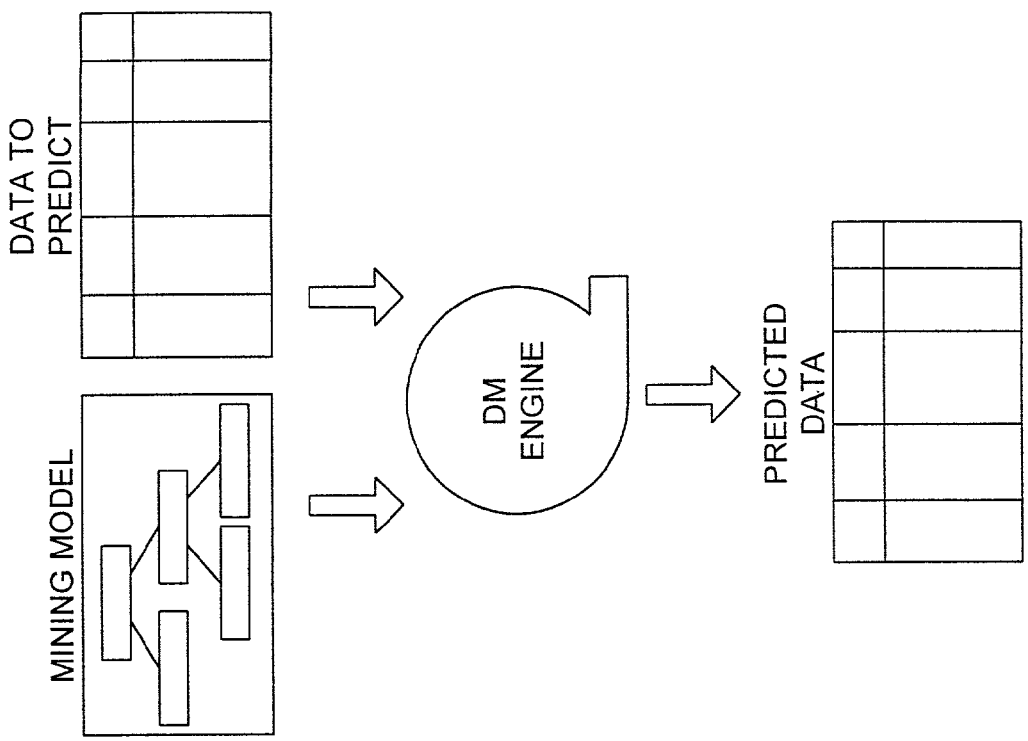
FIG. 6 is a prior art data mining system for a SQL database.
Figure 6:
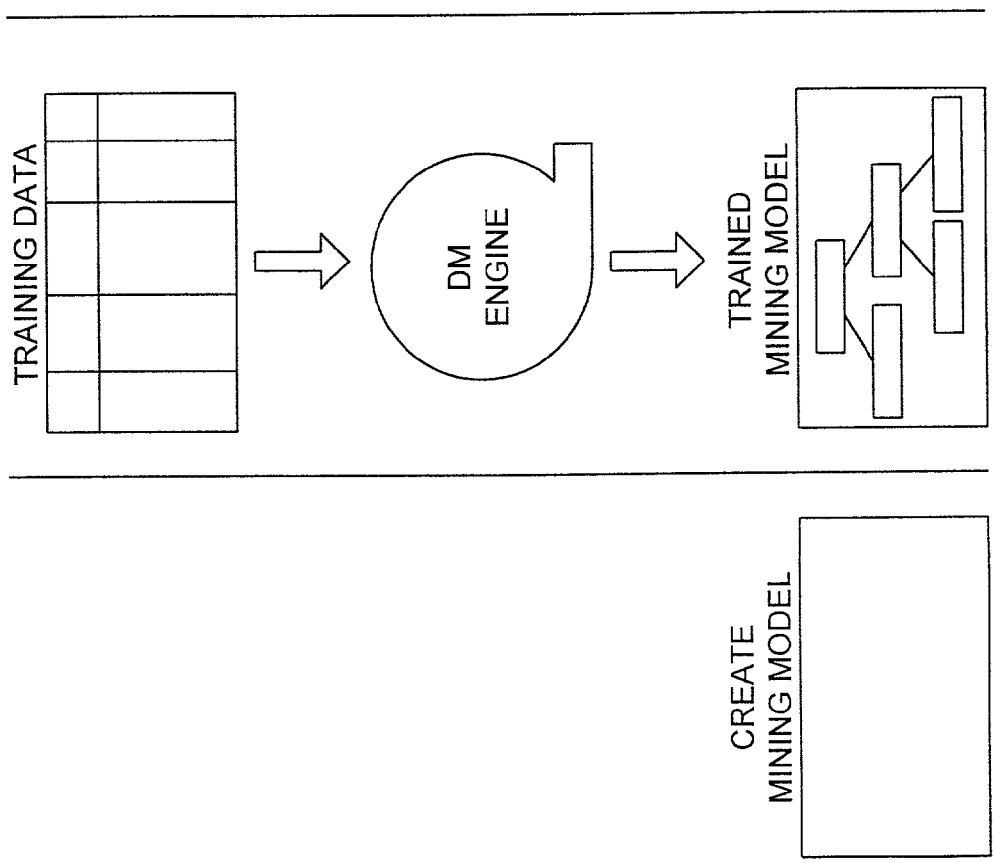

FIG. 4 illustrates an example of a decision tree 400 that is used to classify data into two classes (1 and 2) that indicate whether an individual is at risk for a certain disease. The tree consists of internal nodes 410 that define a simple test on one attribute connected by branches 415 and leaf-level nodes 420 that define a class label. The class label of a new instance is determined by evaluating the test conditions at the nodes 410 and based on the outcome following one of the branches 415 until a leaf node 420 is reached. The label of the leaf is the predicted class of the instance.

An upper envelope for a class in a decision tree data mining model is derived (see step 320 FIG. 3) by ANDing the test conditions on the path from the root node 411 to each leaf of the class and ORing these expressions together. This envelope is "exact" which means that it includes all points belonging to c and no point belonging to any other class. For the decision tree depicted in FIG. 4, the upper envelope of the class $c_1$ is:

"((lowerBP>91)AND(age>63)AND(overweight)) OR ((lowerBP≦91)AND(upperBP>130))".

Similarly, the upper envelope of class c2 is:
"((lowerBP>91)AND(age≦63)) OR ((lowerBP>91)AND(age>63)AND(not overweight)) OR ((lowerBP≦91)AND(upper BP≦130))".

Extraction of upper envelopes for rule-based classifiers is similarly straightforward. A rule-based learner consists of a set of if-then rules where the body of the rule consists of conditions on the data attributes and the head (the part after "then") is one of the k class-labels. The upper envelope of each class c is just the disjunction of the body of all rules where c is the head. Unlike for decision tress, the envelope may not be exact because some rule learners allow rules of different classes to overlap. Therefore, an input instance might fire off two rules, each of which predicts a different class, Typically, a resolution procedure based on the weights or sequential order of rules is used to resolve conflict in such cases. It may be possible to tighten the envelope in such cases by exploiting knowledge of the resolution procedures.

Deriving Upper Envelopes for Naive Bayes Classifiers

Step 320, deriving upper envelopes for classifiers, can also be performed on a database system that uses naïve Bayes classifiers. Bayesian classifiers perform a probabilistic modeling of each class. Let $\vec{x}$ be an instance for which the classifier needs to predict one of K classes $c_1, c_2, \ldots c_K$. The predicted class $C(\vec{x})$ of $\vec{x}$ is calculated as $$C(\vec{x}) = \text{argmax}_k \, Pr(c_k|x) = \text{argmax}\frac{Pr(\vec{x}|c_k)Pr(c_k)}{Pr(\vec{x})}$$

Where $Pr(c_k)$ is the probability of class $c_k$ and $Pr(x|c_k)$ is the probability of $\vec{x}$ in class $c_k$. The denominator $Pr(\vec{x})$ is the same for all classes and can be ignored in the selection of the winning class.

Let n be the number of attributes in the input data. Naïve Bayes classifiers assume that the attributes $x_1, \ldots, x_n$, of $\vec{x}$ are independent of each other given the class. Thus, the above formula becomes:

$$C(\vec{x}) = \text{argmax}_k \left( \prod_{d=1}^{n} Pr(x_d | c_k) Pr(c_k) \right) \quad \text{Equation 1}$$

$$= \text{argmax}_k \left( \sum_{d=1}^{n} \log Pr(x_d | c_k) + Pr(c_k) \right) \quad \text{Equation 2}$$

Ties are resolved by choosing the class which has the higher probability $Pr(c_k)$.

The probabilities $Pr(x_d|c_k)$ and $Pr(c_k)$ are estimated using training data. For a discrete attribute d, let $m_{1d} \ldots m_{ndd}$ denote the $n_d$ members of the domain of d. For each member $m_{1d}$, during the training phase a set of K values corresponding to the probability $Pr(x_d=m_{1d}|c_k)$ is computed. Continuous attributes are either discretized using a preprocessing step or modeled using a single continuous probability density function, the most common being the Gaussian distribution. For the remaining description, it will be assumed that all attributes are discretized.

An example of a naïve Bayes classifier is shown in Table 1 for K=3 classes, n=2 dimensions, first dimension $d_0$ having $n_0$=4 members and the second dimension $d_1$ having $n_1$=3 members. The triplet along the column margin show the trained $Pr(m_{j1}|c_k)$ values for each of the three classes for dimension $d_1$. The row margin shows the corresponding values for dimension $d_0$. For example, the first triplet in the column margin (0.01, 0.07, 0.05) stands for ($Pr(m_{01}|c_1)$, $Pr(m_{01}|c_2)$, $Pr(m_{01}|c_3)$) respectively. The top-margin shows the class priors. Given these parameters, the predicted class for each of the 12 possible distinct instances $\vec{x}$ (found using Equation 1) is shown in the internal cells. For example, the value 0.001 for the top-leftmost cell denotes $Pr(x|c_1)$ where $\vec{x} = (m_{00}, m_{01})$.

The algorithm used to perform step 320 (FIG. 3) for the naïve Bayes classifier finds the upper envelope to cover all regions in the n dimensional attribute space where the classifier will predict a given class $c_k$. For example, the upper envelope for $c_2$ in the classifier shown in FIG. 5 is $(d_o \in \{m_{20}, m_{30}\}$ AND $d_1 \in \{m_{01}, m_{11}\})$ OR $d_1 = m_{01}$). This envelope is expressed as two regions described by their boundaries as $(d_0:[2 \ldots 3], d_1:[0 \ldots 1]) \vee (d_1: [0 \ldots 0])$.

For each combination in this n dimensional space, the predicted class is enumerated as in the example above. Then all combinations are covered where class $c_k$ is the winner with a collection of contiguous regions using any of the known multidimensional covering algorithms. Each region will contribute one disjunct to the upper envelope. In fact, this generic algorithm may be applicable to any classification algorithm, not limited to naïve Bayes. However, it is impractically slow to enumerate all $$\prod_{d=1}^{n} n_d$$

($n_d$ is the size of the domain of dimension d) member combinations. It has been observed that a medium sized data set takes more than 24 hours to enumerated all combinations. The following top-down approach avoids this exponential enumeration.

A top-down algorithm proceeds by recursively narrowing down the region belonging to the given class $c_k$ for which an upper envelope is being derived. The algorithm exploits efficiently computable upper bounds and lower bounds on the probabilities of classes to quickly establish the winning and losing classes in a region consisting of several combinations.

The algorithm starts by assuming that the entire region belongs to class $c_k$. It then estimates an upper bound maxProb($c_j$) and lower bound minprob(cj) on the probabilities of each class $c_j$ as follows:

$$\text{maxProb}(cj) = Pr(cj)\left(\prod_{d=1}^{n} \max_{l \in 1 \ldots n_d} Pr(m_{ld} | c_j)\right)$$

$$\text{minProb}(cj) = Pr(cj)\left(\prod_{d=1}^{n} \min_{l \in 1 \ldots n_d} Pr(m_{ld} | c_j)\right)$$

Computation of these bounds requires time linear with respect to the number of members along each dimension. In FIG. 5b, column (a) shows the minProb (second row) and maxProb (third row) for the region shown in FIG. 5a. For example, in FIG. 5b the minprob value of 0.005 for class $c_2$ is obtained by multiplying the three values $Pr(c_2)=0.5$, $\min_{l \in 0 \ldots 3} Pr(m_{l0}|c_2) = \min(0.1, 0.1, 0.4, 0.4)=0.1$, $\min_{l \in 0 \ldots 2} Pr(m_{l1}|c_c)=\min(0.7, 0.29, 0.01)=0.01$.

Using these bounds, the class of the region can be partially reasoned to distinguish amongst one of three outcomes:

1. MUST-WIN: All points in the region belong to class $c_k$. This is true if the minimum probability of class $c_k$ (minProb ($c_k$)) is greater than the maximum probability (maxProb($c_j$)) values of all classes $c_j$.

2. MUST-LOSE: No points in the region belong to class $c_k$. This is true if there exists a class $c_j$ for which maxprob ($c_k$)<minProb($c_j$). In this case class $c_j$ will win over class $c_k$ at all points in this region.

3. AMBIGUOUS: Neither of the previous two conditions apply, i.e., possibly a subset of points in the region belong to the class.

When the status of a region is AMBIGUOUS, the region is shrunk and split into smaller regions. The upper and lower bounds in each region are re-evaluated and then the above tests are applied recursively until all regions either satisfy one of the first two terminating conditions or the algorithm has made a maximum number of splits (an input parameter of the algorithm). Table 1 lists pseudocode for the algorithm, called UpperEnvelope($c_k$).

TABLE 1

1: T:Tree initialized with the entire region as root
2: while number of tree nodes expanded <Threshold do
3:   r = an unvisited leaf of T;
4:   r.status = Compute using $c_k$ and maxProb, minProb values of r
5:   if r.status = MUST-WIN then mark r as visited;
6:   if r.status = MUST-LOSE then remove r from T;
7:   if r.status = AMBIGUOUS then
8:     Shrink r along all possible dimensions;
9:     Split r into $r_1$ and $r_2$;
10:    Add $r_1$ and $r_2$ to T as children of r;
11:   endif
12: end while
13: Sweep T bottom-up merging all contiguous leaves
14: Upper_Envelope($c_k$) = disjunct over all leaves of T For the shrink portion of the algorithm, each member $m_{ld}$ in each dimension d is evaluated to arrive at the maxProb($c_j$, d, $m_{ld}$) and the minProb($c_j$, d, $m_{ld}$) value as:

$$\text{max}Prob(cj, d, m_{ld}) = Pr(cj)Pr(m_{ld} | c_j)\left(\prod_{e \neq d} \max_r Pr(m_{re} | c_j)\right)$$

$$\text{min}Prob(cj, d, m_{ld}) = Pr(cj)Pr(m_{ld} | c_j)\left(\prod_{e \neq d} \min_r Pr(m_{re} | c_j)\right)$$

These revised tighter bounds are used to further shrink the region where possible. The MUST-LOSE condition is tested on the revised bounds and any members of an unordered dimension that satisfy this condition are removed. For ordered dimensions, only members from the two ends are removed to maintain contiguity.

Referring to FIG. 5b column (a), based on the minProb and maxProb values of the starting region [0 ... 3], [0 ... 2], it is observed that neither of the MUST-WIN or MUST-LOSE situations hold for class $c_1$. Hence the situation is AMBIGUOUS for $c_1$ and this region should be shrunk. Column (b) shows the revised bounds for the last member $m_{21}$ of dimension 1. This leads to a MUST-LOSE situation for class $c_1$ because in the region maxProb for class $c_1$ is smaller than minProb for class $c_2$. The new maxProb and minProb values are shown in column (c). The shrunk region is again in an AMBIGUOUS state, so it will be split as follows.

Regions are split by partitioning the values along a dimension. In evaluating the best split, methods that require explicit enumeration of the class are avoided. The goal of the split is to separate out the regions that belong to class $c_k$ from the ones that do not belong to $c_k$. The entropy function for quantifying the skewness in the probability distribution of class $c_k$ along each dimension is used to perform the separation. The details of the split follow from the case of binary splits during decision tree construction. The entropy function is evaluated for split along each member of each dimension and the split that has the lowest average entropy in the sub-regions is chosen. Unlike splits during decision tree construction, explicit counts of each class are not made and instead the probability values of the members on each side of the splitting dimension are relied on in the splitting decision.

Columns (d) and (e) show the two regions obtained by splitting dimension $d_0$ into [0 . . . 1] and [2 . . . 3]. The first sub-region shown in column ($d_0$ leads to a MUST-WIN situation and gives one disjunct for the upper envelope of class $c_1$. The second region is still in an AMBIGUOUS situation—however a second round of shrinkage along dimension $d_1$ on the region leads to an empty region and the top-down process terminates.

Once the top-down split process terminates, all regions that do not satisfy the MUST-LOSE condition are merged. During the course of the partitioning algorithm the tree structure of the split is maintained so that whenever all children of a node belong to the same class, they can be trivially merged together. Then another iterative search for pairs of non-sibling regions that can be merged is performed. The output is a set of non-overlapping regions that totally subsume all combinations belonging to a class.

The top-down algorithm has a complexity of O(tnmK) where t is the threshold that controls the depth of the tree to and $$m = \max_{d=1}^{n}(n_d)$$

is the maximum length of a dimension. This complexity can be contrasted with the exponential complexity $$K\prod_{d=1}^{n} n_d$$

of the enumeration step alone of the naive algorithm.

Deriving Upper Envelopes for Clustering Models

Clustering models are of three broad kinds: partitional, hierarchical, and fuzzy. For the purposes of this description, partitional clustering will be discussed in which the output is a set of k clusters. Partitional clustering methods can be further subdivided based on membership criteria used for assigning new instances to clusters into centroid-based clustering, model-based clustering, and boundary-based clustering (commonly arising in density-based clustering).

In centroid-based clustering, each cluster is associate with a single point called the centroid that is most representative of the cluster. An appropriate distance measure on the input attributes is used to measure the distance between the cluster centroid and the instance. A common distance function is Euclidean or weighted Euclidean. The instance is assigned to the cluster with the closest centroid. This partitions the data space into K disjoint partitions where the i-th partition contains all points that are closer to the ith centroid than to any other centroid. A cluster's partition could take arbitrary shapes depending on the distance function, the number of clusters, and the number of hyper-rectangles.

A second class of clustering methods is model-based. Model-based clustering assumes that data is generated from a mixture of underlying distributions in which each distribution represents a group or cluster.

Both distance-based and model-based clusters can be expressed exactly as naive Bayes classifiers for the purposes of finding the upper envelopes. Let $c_1, c_2, \ldots c_k$ be the K clusters in a distance-based clustering. Let n be the number of attributes or dimensions of an instance $\vec{x}$ and $(c_{1k} \ldots c_{nk})$ be the centroid of the k-th cluster. Assuming a weighted Euclidean distance measure, let $(w_{1k} \ldots w_{nk})$ denote the weight values. Then, a point $\vec{x}$ is assigned to a cluster as follows:

$$\text{cluster of } \vec{x} = \text{argmax}_k \sum_{d=1}^{n} w_{dk}(x_d - c_{dk})^2$$

This is similar in structure to Equation 2 with the prior term missing. In both cases, for each component of $\vec{x}$ a set of K values corresponds to the K different clusters/classes. A sum over these n values is calculated along each dimension and the class with the largest sum is chosen from among the K sums calculated.

For several model-base cluster the situation is similar. Each group k is associated with a mixing parameter called $$\tau_k \left( \sum_{k=1}^{K} \tau_k = 1 \right)$$

in addition to the parameters $\Theta_k$ of the distribution function of that group. Thus, an instance will be assigned to the cluster with the largest value of:

$$\text{cluster of } \vec{x} = \text{argmax}_k(\tau_k f_k(\vec{x}|\Theta_k))$$

When the distribution function $f_k$ treats each dimension independently, for example, mixtures of Gaussians with the covariance entries zero, the above expression can be expressed in the same form as Equation 2.

Boundary-based clusters explicitly define the boundary of a region within which a point needs to lie in order to belong to a cluster. Deriving upper envelopes is equivalent to covering a geometric region with a small number of rectangles. This is a classical problem in computation geometry for which several approximate algorithms exist.

As can be seen from the foregoing description, "atomic" upper envelopes can be derived for a variety of types of data classifiers flowing from various mining techniques. Once these upper envelopes have been derived, they can be used to form upper envelopes to be appended to a user query containing a mining predicate based on the form of the mining predicate. The appended upper envelopes present additional alternatives for query optimization that can lead to more efficient processing of queries containing mining predicates. Although the present invention has been described with a degree of particularity, it is the intent that the invention include all modifications and alterations from the disclosed design falling within the spirit or scope of the appended claims.

We claim:

1. A computer implemented method for evaluating a user query on a database having a mining model that classifies records contained in the database into classes and assigns a class label to each record, wherein the query comprises at least one mining predicate that refers to a class label of database records, the method comprising the steps of:
    deriving an upper envelope for the class label referred to by the mining predicate wherein the upper envelope is a query predicate of the form $M_c(\vec{x})$ which corresponds to a query predicate that returns a set of database records that includes all of the database records having that class label assigned thereto; and
    including the upper envelope with the user query for query evaluation of the user query on the database records of the database;
    wherein the deriving step is performed during a preprocessing phase by:
    building a mining model;
    evaluating the mining model to extract a set of classes and class labels for the database records;
    deriving an upper envelope for each class label while building the model; and
    storing the upper envelopes for access during user query evaluation.

2. The computer implemented method of claim 1 comprising the step of forming an upper envelope by combining a plurality of upper envelopes.

3. The computer implemented method of claim 2 wherein the user query seeks to return data records whose class label is a member of a given set of class labels and wherein the upper envelope comprises a disjunct of the upper envelopes for each class label in the set of class labels referred to by the user query.

4. The computer implemented method of claim 2 wherein the database has at least two mining models and wherein the user query seeks to return data records whose class label has been assigned the same class label by all mining models and wherein the upper envelope is formed by enumerating class labels for each of the mining models, finding upper envelopes for each mining model by forming a conjunctive expression of the upper envelope for each class label in the mining model, and taking the disjunction of these conjunctive expressions over all class labels.

5. The computer implemented method of claim 2 wherein the mining model assigns a class label to a data record that predicts the value of a given column in the data record and the user query seeks to return data records in which the predicted value matches the actual value in the data column and wherein the upper envelope for that class is formed by enumerating each class label for the mining model, finding an upper envelope for each class label, forming a conjunctive expression of the upper envelope and a predicate that selects data records where the given column is equal to the class label, and forming a disjunctive expression of these conjunctive expressions over all class labels.

6. The computer implemented method of claim 1 wherein the mining model is a decision tree comprising a root node connected to test nodes having test conditions and leaf nodes having a class label and wherein the upper envelope for a given class label is derived by forming a conjunct of the test conditions between the root and each leaf node having the given class label and forming a disjunct of the conjuncts of the test conditions.

7. The computer implemented method of claim 1 wherein the mining model is a rule based learner comprising a set of if-then rules, each rule having a body comprising conditions on the data attributes and a head comprising one of the class labels and wherein the upper envelope for a given class label is derived by forming a disjunct of the rules having the given class label as the head.

8. The computer implemented method of claim 7 wherein the boundaries are described in terms of ranges of attribute values.

9. The computer implemented method of claim 7 wherein the upper envelope for a given class label is derived by describing an initial region that covers the entire n dimensional space, removing sub-regions that do not contain any data records having the given class label, and describing the resulting region.

10. The computer implemented method of claim 9 wherein a sub-region is removed from the initial region by calculating a probability that the data records in the sub-region have a given class label and removing the sub-region if the probability is below a predetermined threshold.

11. The computer implemented method of claim 10 wherein a probability that data records in the sub-region having a certain class label is calculated for all class labels and the upper envelope for the given class label is derived by removing a sub-region based on a comparison between the probability for the given class label and the probabilities for the other class labels.

12. The computer implemented method of claim 9 wherein sub-regions that contain data records having different class labels are shrunk and re-evaluated to determine if they should be removed.

13. The computer implemented method of claim 9 wherein sub-regions that contain data records having different class labels are split into sub-regions and the split sub-regions are re-evaluated to determine if they should be removed.

14. The computer implemented method of claim 13 wherein the sub-regions are split in a manner that minimizes entropy.

15. The computer implemented method of claim 9 comprising the step of merging sub-regions that have been removed.

16. The computer implemented method of claim 7 wherein the mining model determines each class as a centroid and a region surrounding the centroid and wherein the upper envelope for a given class label is derived by describing a set of rectangular regions that cover the region for the given class label.

17. The computer implemented method of claim 1 wherein the upper envelopes are removed prior to execution of the user query.

18. The computer implemented method of claim 1 wherein the size of the upper envelope is limited to a predetermined number of terms.

19. The method of claim 1 wherein the data records have n attributes and the mining model assigns class labels to each data record and each class label of each data record is assigned a position based on attribute values in an n dimensional space having a dimension for each attribute and wherein the upper envelope for a given class label is derived by forming a disjunct of boundaries of regions that cover all data records having the given class label.

20. A computer readable medium having computer executable instruction stored thereon for performing method steps for evaluating a user query on a database having a mining model that classifies records contained in the database into classes and assigns a class label to each record, wherein the query comprises at least one mining predicate that refers to a class label of database records, the method steps comprising:

deriving an upper envelope for the class label referred to by the mining predicate wherein the upper envelope is a query predicate of the form $M_c(\vec{x})$ which corresponds to a query predicate that returns a set of database records that includes all of the database records having that class label assigned thereto; and including the upper envelope with the user query for query evaluation of the user query on the database records of the database;

wherein the deriving step is performed during a preprocessing phase by:

building a mining model;

evaluating the mining model to extract a set of classes and class labels for the database records;

deriving an upper envelope for each class label while building the model; and storing the upper envelopes for access during user query evaluation.

21. The computer readable medium of claim 20 wherein the method steps comprise the step of forming an upper envelope by combining a plurality of upper envelopes.

22. The computer readable medium of claim 21 wherein the user query seeks to return data records whose class label is a member of a given set of class labels and wherein the upper envelope comprises a disjunct of the upper envelopes for each class label in the set of class labels referred to by the user query.

23. The computer readable medium of claim 21 wherein the database has at least two mining models and wherein the user query seeks to return data records whose class label has been assigned the same class label by all mining models and wherein the upper envelope is formed by enumerating class labels for each of the mining models, finding upper envelopes for each mining model by forming a conjunctive expression of the upper envelope for each class label in the mining model, and taking the disjunction of these conjunctive expressions over all class labels.

24. The computer readable medium of claim 21 wherein the mining model assigns a class label to a data record that predicts the value of a given column in the data record and the user query seeks to return data records in which the predicted value matches the actual value in the data column and wherein the upper envelope for that class is formed by enumerating each class label for the mining model, finding an upper envelope for each class label, forming a conjunctive expression of the upper envelope and a predicate that selects data records where the given column is equal to the class label, and forming a disjunctive expression of these conjunctive expressions over all class labels.

25. The computer readable medium of claim 21 wherein the mining model is a decision tree comprising a root node connected to test nodes having a test condition and leaf nodes having a class label and wherein the upper envelope for a given class label is derived by forming a conjunct of the test conditions between the root and each leaf node having the given class label and forming a disjunct of the conjuncts of the test conditions.

26. The computer readable medium of claim 20 wherein the mining model is a rule based learner comprising a set of if-then rules, each rule having a body comprising conditions on the data attributes and a head comprising one of the class labels and wherein the upper envelope for a given class label is derived by forming a disjunct of the rules having the given class label as the head.

27. The computer readable medium of claim 20 wherein the data records have n attributes and the mining model assigns class labels to each data record and each class label of each data record is assigned a position based on attribute values in an n dimensional space having a dimension for each attribute and wherein the upper envelope for a given class label is derived by forming a disjunct of boundaries of regions that cover all data records having the given class label.

28. The computer readable medium of claim 27 wherein the boundaries are described in terms of ranges of attribute values.

29. The computer readable medium of claim 27 wherein the upper envelope for a given class label is derived by describing an initial region that covers the entire n dimensional space, removing sub-regions that do not contain any data records having the given class label, and describing the resulting region.

30. The computer readable medium of claim 29 wherein sub-regions that contain data records having different class labels are shrunk and re-evaluated to determine if they should be removed.

31. The computer readable medium of claim 29 wherein sub-regions that contain data records having different class labels are split into sub-regions and the split sub-regions are re-evaluated to determine if they should be removed.

32. The computer readable medium of claim 29 wherein the method steps comprise the step of merging sub-regions that have been removed.

33. The computer readable medium of claim 27 wherein the mining model determines each class as a centroid and a region surrounding the centroid and wherein the upper envelope for a given class label is derived by describing a set of rectangular regions that cover the region for the given class label.

34. An apparatus for evaluating a user query on a database having a mining model that classifies records contained in the database into classes and assigns a class label to each record, wherein the query comprises at least one mining predicate that refers to a class label of database records, the apparatus comprising:

means for deriving an upper envelope for the class label referred to by the mining predicate wherein the upper envelope is a query predicate of the form $M_c(\vec{x})$ which corresponds to a query predicate that returns a set of database records that includes all of the database records having that class label associated therewith; and means for including the upper envelope with the user query for query evaluation of the user query on the database records of the database;

wherein the means for deriving an upper envelope does so during a preprocessing phase by:

building a mining model;

evaluating the mining model to extract a set of classes and class labels for the database records;
deriving an upper envelope for each class label while building the model; and
storing the upper envelopes for access during user query evaluation.

35. The apparatus of claim 34 comprising means for forming an upper envelope by combining a plurality of upper envelopes.

* * * * *